United States Patent Office 2,945,014
Patented July 12, 1960

2,945,014

ESTERS OF BORIC ACID AND COPOLYMERS CONTAINING A PLURALITY OF HYDROXYL GROUPS

James Hartley, Wirral, and John D. Downer, Newton, England, assignors to Shell Oil Company, a corporation of Delaware No Drawing. Filed Jan. 27, 1958, Ser. No. 711,181

Claims priority, application Great Britain Feb. 1, 1957

11 Claims. (Cl. 260—87.3)

This invention relates to a new and useful class of organic esters of boric acid; more particularly, this invention relates to esters of boric acid and polymeric compounds containing a plurality of non-acidic hydroxyl groups.

It is known that the presence of compounds containing boron in gasolines and lubricating oils used in spark ignition internal combustion engines has the beneficial effects of reducing the octane number of the fuel required by those engines, and of suppressing preignition of the fuel used therein. However, there have been a number of serious problems associated with this use of boron compounds. There is a tendency for the organic compounds proposed for this use, for example, esters of boric acid, to be leached from gasoline and lubricating oil solutions thereof by the water with which those solutions invariably come into contact during commercial handling. Also, most, if not all, inorganic boron compounds are insoluble in liquid hydrocarbons, and dispersions of such inorganic boron compounds in liquid hydrocarbons have been generally unsatisfactory because of their instability on standing, with resultant settling of such compounds from those dispersions.

We have now discovered a new class of organic boron compounds which are readily soluble and/or stably dispersible in liquid fuels, such as gasoline, and in lubricant base stocks. These new organic boron compounds are, generically, esters of boric acid and polymeric compounds containing a plurality of non-acidic hydroxyl groups, said polymeric compounds having a molecular weight of at least 1000 and having been prepared by copolymerization of an olefin having at least 8 carbon atoms per molecule and an unsaturated polymerizable compound containing a hydroxyl group or a group which can be converted to a hydroxyl group, and, where this latter type of unsaturated polymerizable compound is used, treatment of the resulting copolymer to hydrolyze at least a part of the convertible groups to hydroxyl groups. By non-acidic hydroxyl group is meant any hydroxyl group not forming a part of a carboxyl group, and which is not of phenolic character.

Suitable polymeric compounds of this kind can be prepared by copolymerizing an olefin containing at least 8 carbon atoms per molecule with an unsaturated organic ester as described in United States Patent No. 2,551,643, followed by hydrolysis of the product copolymers by the method described in United States Patents Nos. 2,421,971 and 2,467,774.

The preferred subgenus of the suitable polyhydroxy polymeric compounds comprises the oil-soluble high molecular weight polyalcoholic polymeric compounds obtained by substantially completely hydrolyzing the copolymers of long chain alpha olefinic hydrocarbons (normal or branched-chain) containing a terminal —CH=CH$_2$ group and containing an uninterrupted chain of at least 10—and preferably at least 16—carbon atoms with a vinyl ester of a lower fatty acid having up to five carbon atoms, such as vinyl acetate. These hydrolyzed polymeric compounds are macromolecular compounds containing essentially a plurality of recurring alkyl-1,2-ethylene and hydroxy-1,2-ethylene units joined together in a chain-like manner, wherein the alkyl radicals contain at least 8 carbon atoms; and there may be a minor proportion of alkanoyloxy-1,2-ethylene units as essentially the only other polar containing group. The ratio of the non-acidic oxygen-containing units—(hydroxyl- and alkanoyloxy-) 1,2-ethylene units—to the hydrocarbon units—alkyl-1,2-ethylene units—is from about 1 to about 6, and preferably from about 1 to about 5. The average molecular weight of the final product preferably is from about 1,500 to 50,000 and still more preferably the molecular weight of the product is from about 4,000 to about 15,000. (These molecular weights are those obtained by the light scattering methods set out in Chemical Reviews, vol. 40, p. 139 (1948).) The non-acidic oxygen-containing polar groups present in the final product are predominantly hydroxyl, being at least 80% hydroxyl, preferably at least 90% or as high as 99% of the non-acidic oxygen-containing polar mixture. The product must contain at least two non-acidic hydroxyl groups per molecular unit of the copolymer and preferably the copolymer contains at least 3 such hydroxyl groups per molecule.

These special copolymers are preferably prepared by copolymerizing a vinyl ester of a lower fatty acid such as acetic acid, propionic acid, isobutyric acid or isovaleric acid, with an ethylenically unsaturated monomer having a single ethylenic group and containing at least 10, and preferably at least 16 carbon atoms, the ester and ethylenic compound being reacted in such proportions as to form a copolymer having the desired molecular weight and an average of from 1 to 6 units of the vinyl ester per unit of the hydrocarbon group derived from the ethylenic compound, and then hydrolyzing this product so as to convert from 25% to 99% of the vinyl ester linkages to hydroxyl groups, each molecular unit of the copolymer product containing at least two such hydroxyl groups. Such copolymeric compounds and methods for producing them are described in detail in United States Patent No. 2,800,453, and in copending United States Patent application Serial No. 550,391, filed December 1, 1955. To completely, yet concisely describe these preferred polymeric compounds and methods of making them, the pertinent portions of No. 2,800,453 and of Serial No. 550,391 are hereby incorporated into and made a part of this specification.

The compounds provided by this invention are esters of boric acid. That is to say, the compounds of this invention contain the structural element

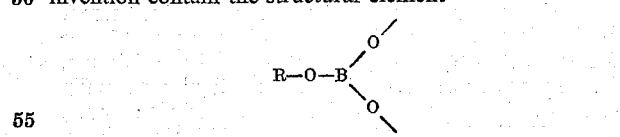

wherein R is the residue of the polyhydroxyl polymeric compound. These compounds are described as esters because, although they may be prepared by other methods, they can be considered to have been prepared by esterification of the polyhydroxyl polymeric compound by boric acid, with elimination of water, thus:

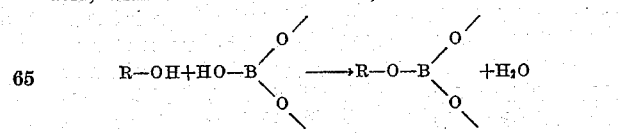

By the term "boric acid" is meant all inorganic acidic compounds containing only boron, oxygen and hydrogen atoms and derived from reaction of boron trioxide with varying amounts of water. Included are tetraboric acid ($H_2B_4O_7$), metaboric acid ($HBO_2$), and orthoboric acid ($H_3BO_3$) and the various complex compounds which these boric acids form with themselves, including those having the formulas: $H_2B_2O_4$, $H_2B_6O_{10}$, $H_2B_8O_{13}$, $H_2B_{12}O_{19}$, $H_6B_4O_9$ and $H_6B_8O_{15}$ as examples thereof. Of these, the most important, and the preferred acid for the purposes of this invention, is orthoboric acid.

The new esters of boric acid (i.e., borates) of this invention includes those wherein it may be considered that each of the acidic hydroxyl groups of the boric acid has been reacted with a hydroxyl group of the polymeric compound—i.e., the neutral borates or, equivalently, the triesters of boric acid—and those wherein it may be considered that but one or two of the acidic hydroxyl groups of the boric acid has been reacted with a hydroxyl group of the polymeric compound—i.e., the partial esters of boric acid, or equivalently, the acid borates. Also included in the new class of compounds are those wherein it may be considered that each—i.e., all—of the hydroxyl groups of the polymeric compound has been reacted with boric acid, and those wherein it may be considered that but part—less than all—of the hydroxyl groups of the polymeric compound have been reacted with boric acid.

The new esters of boric acid provided by this invention are conveniently prepared by any one of a number of methods, all of which involve direct reaction of the polyhydroxyl polymeric compound with the boric acid, or other boron compound such as boron trioxide, or an organic borate ester, which is capable of reacting with the polyhydroxyl polymeric compound to form a borate ester.

Thus, esters of the invention may be prepared by simply heating a mixture of the polyhydroxyl polymeric compound and the boric acid reactant. However, it has been found preferable to first dissolve the polymeric compound in a suitable inert solvent. Most convenient for this purpose is a substantially non-polar organic liquid, that is, an organic liquid which has an electric dipole moment not greater than that exhibited by branched-chain hydrocarbons—i.e., an electric dipole moment less than about 0.5 Debye unit. It is preferred that the electric dipole moment of the liquid be 0.0. By the term "Debye unit" is meant that measurement of electric dipole moment normally given this name. One Debye unit is defined to equal $1 \times 10^{-18}$ electrostatic units. As used in this specification, the term "electric dipole moment" has its usual meaning—i.e., it is a description or measure of the magnitude of the dipole electrostatic field existing in a given organic compound, the magnitude of the moment being the product of either of the two (opposite) electrostatic charges and the distance between those charges. Further, the term "electric dipole moment" is herein used to mean the electric dipole moment of a compound or solution at ordinary temperatures—e.g., about 20 to 25° C. The value(s) of such dipole moment(s) for organic compounds in the pure form or in a representative solvent are given in such compilations of physical data as "Tables of Electric Dipole Moments" compiled by L. G. Wesson, The Technology Press (1948). These liquids normally are substantially immiscible with water. Included among the suitable liquids are the normally liquid hydrocarbons, which term includes those liquids which are generally referred to as "liquid fuels," mainly liquid hydrocarbons boiling in the gasoline, kerosene or fuel oil ranges. Also included among the suitable liquids are those which are referred to herein as "lubricating oils," mainly mixtures of liquid hydrocarbons obtained from petroleum and boiling in the lubricating oil ranges, but also including synthetic lubricating oils of suitable low dipole moment, such as the dialkyl esters of long-chain aliphatic dicarboxylic acids and the polyoxyalkylene liquids. Individual compounds, both aromatic (such as benzene, toluene, the xylenes) and aliphatic (such as the normally liquid alkanes, such as heptane, octane, and the like), including both straight-chain and branched-chain configurations, and mixtures of such compounds are suitable. The normally liquid hydrocarbons, including those boiling as low as the gasolines, and those boiling as high as the lubricating oils, are preferred.

When such a solution of the polyhydroxyl polymeric compound is used, the concentration of the polymeric compound in the non-polar organic liquid is not critical—the primary requirement is that sufficient of the non-polar liquid be used to completely dissolve the polymeric compound and to provide a readily fluid solution. The concentration of the polymeric compound in the non-polar liquid should, however, be at least about 5% by weight (based on the sum of the weights of the polymeric compound and the non-polar liquid) to provide reasonable reaction rates.

Where the boric acid reactant is boric acid per se, or is boron trioxide, the reaction is conducted by mixing the polyhydroxyl polymeric compound, or the solution thereof, and the boric acid reactant, and heating that mixture until esterification is complete. While the esterification goes forward at any temperature above about 50° C., it is preferred to use temperatures of about 100° C. so that the water formed in the course of the esterification reaction will vaporize, and can be removed as fast as it is formed. In many cases, it will be found desirable to use a non-polar solvent such as benzene which is sufficiently low-boiling, and which forms an azeotrope with water, so that the water of reaction can be removed by azeotropic distillation of the reaction mixture during the course of the reaction. The reaction may be carried out in the presence of any of the materials generally known to promote and/or catalyze esterification reactions; in general, however, it will be found that the use of such a catalyst will not be required.

Where the boric acid reactant is an organic ester of boric acid, the reaction is conducted in a similar manner, with the exception that if a non-polar solvent is used, it is one that will not interfere with removal of the alcohol formed by the reaction of the polymeric material and the borate ester. While as a general matter, any organic ester of boric acid can be used, it is preferred to use the alkyl (including mono- di- and trialkyl) borates, since these compounds are readily available and are readily reactive with the polyhydroxyl polymeric compounds considered herein. The alkyl borates in which the alkyl group or groups each are lower alkyl groups, and especially those containing up to six carbon atoms, are preferred. Typical of these esters are the methyl, ethyl, propyl and butyl borates.

In some cases, it may be found desirable to employ a solvent for the boric acid reactant. Suitable as the solvent is any neutral organic liquid which is substantially miscible with water, and it is preferred that the organic liquid be completely miscible with water. By substantially water-miscible organic liquid is meant organic liquids which are capable of forming homogeneous mixtures with up to about 10% by volume of water in addition to those organic liquids which are miscible with water in higher proportions, for example, at least 50% by volume. Organic liquids which are miscible with water in all proportions are, however, preferred. Suitable organic liquids include such compounds as alcohols, ketones, alkyl esters of lower monocarboxylic acids, ethers, including heterocyclic ethers such as the dioxanes, and amides, such as dimethyl formamide. The preferred organic liquids are the oxygen-containing organic liquids having an electric dipole moment (as that term has hereinbefore been defined) of at least about 1.0 Debye unit and which boil below the initial boiling point of the non-polar organic liquid and preferably should either boil below 100° C. or form an azeotrope with water which boils below 100° C. at atmospheric pressure. It is preferred that the oxygen-containing organic liquid be aliphatic in character, which includes also the cyclo-aliphatic compounds, the aliphatic alcohols, the aliphatic ketones, such as methyl ethyl ketone, diethyl ketone, methyl propyl ketone and cyclohexanone; the aliphatic ethers, such as diisopropyl ether, methyl and ethyl cellosolves and the like, and esters of aliphatic carboxylic acids, such as ethyl acetate, ethyl lactate, ethyl propionate, and n- and isopropyl acetates. A preferred class of the oxygen-containing organic liquids comprises the monohydric lower aliphatic alcohols, particularly those containing from 1 to about 6 carbon atoms. Examples of this class include methanol, ethanol, 1- and 2-propanols, n-, sec-, and tert-butyl alcohols, and the various $C_5$- and $C_6$ alcohols, both straight-chain and branched-chain in configuration. Since it is preferred that the oxygen-containing organic liquid be completely water-miscible, the alkanols containing from 1 to 4 carbon atoms are most desirable. In general, optimum utilization of the boron present in the reaction zone appears to be obtained where isopropyl alcohol or the $C_4$ alkanols, particularly n- and iso-butyl alcohols are used.

The boric acid reactant may be first dissolved in the solvent and the solution added to the solution of the polymeric compound, or the boric acid reactant may first be mixed with the solution of the polymeric compound and the water-miscible solvent added thereafter. Often, it is most convenient to add the water-miscible solvent slowly, removing water of reaction or alcohol of reaction as formed.

Where a solution of the boric acid reactant in a water-miscible liquid is used, sufficient of that liquid should be used to completely dissolve the boric acid reactant, and to provide a readily fluid solution.

It is preferred that the amount of water-miscible liquid, if used, comprise at least about 5% by weight, and preferably 10% by weight of the total liquid present in the reaction zone—i.e., the sum of the weights of the non-polar liquid and the water-miscible liquid. It is preferred that the amount of water-miscible liquid be at least about 20% of the total weight of liquid present in the reaction mixture.

When the alkyl borates are used as the boric acid reactants, it is most convenient to use as the solvent therefor the alcohol containing the same alkyl moiety as is present in the alkyl borate reactant.

Still another method for preparing the esters of the invention comprises forming boric acid in situ in the presence of the polyhydroxyl polymeric compound, which preferably is in solution in a non-polar organic liquid. Two general variations of this method are available. In the first, an inorganic metal salt of boric acid, for example, borax (sodium tetraborate, $Na_2B_4O_7$), is mixed with a solution of the polymeric compound, the mixture is heated and an ammonium salt, such as ammonium chloride, is added gradually to the mixture. The ammonium salt apparently reacts with the inorganic borate to release boric acid, ammonia and the inorganic metal salt of the anion of the added ammonium salt. While any inorganic metal salt of boric acid may be used, it is preferred to use borax because of its wide availability at low cost. Also, while any ammonium salt may be used, it is preferred to use ammonium chloride because of its wide availability at low cost and because the sodium chloride formed on reaction of the borax with the ammonium salt is easily removed from the reaction mixture. The amounts of inorganic metal borate and ammonium salt should be substantially equivalent and so chosen as to provide the desired amount of boric acid in the reaction mixture. Thus, where borax is used as the inorganic metal borate, about two moles of ammonium chloride should be provided per mole of borax, and 4 moles of boric acid will be produced. Preferably, the ammonium salt is provided as an aqueous solution, and the reaction mixture is maintained at about the boiling point of water to effect removal of the ammonia formed in the reaction, together with water, both as gases, during the course of the reaction.

In the second general variation of this in situ method, the boric acid esters of the invention are prepared by adding a solution of a hydrolyzable ester of boric acid in a water-miscible solvent to a solution of the polymeric compound in a non-polar solvent, adding water to effect hydrolysis of the triester of boric acid, whereby the boric acid being formed reacts with the polymeric compound, and thereafter removing the water-miscible solvent from the reaction mixture, as by distillation or evaporation.

As the "organic ester of boric acid" (i.e., the organic borate), there may be used any ester of boric acid (as this term has been defined hereinbefore)—any organic borate—which readily reacts with water to form a free boric acid and the corresponding alcohol of the ester group. It is preferred that the organic borate be such that the alcohol formed on hydrolysis of the borate either boils below 100° C. or forms an azeotrope with water which boils below 100° C. at atmospheric pressure. The suitable organic borates include the mono-esters, the diesters and the triesters of orthoboric acid, and the monoesters of metaboric acid. In the di- and triesters, the ester groups may be the same, or they may be different, and each may be of straight-chain, branched chain or cyclic configuration. The preferred organic borates are those which are readily soluble in liquid hydrocarbons. As is pointed out at pages 971 and 982-3 of the article by M. F. Lappert, entitled, "Organic Compounds of Boron," in volume 56 of Chemical Reviews, organic orthoborates and metaborates generally hydrolyze readily. The alkyl orthoborates, particularly those wherein each alkyl group is a lower alkyl group (i.e., containing up to 10 carbon atoms), are preferred, and of this group the trialkyl orthoborates in which each alkyl group contains from 1 to 6 carbon atoms are most desirable.

Although methanol and ethanol have the advantage of being fairly volatile and therefore easily removed by distillation, there use does not lead to some loss of alkyl borate and consequent reduction in the boron utilization owing to the formation of a low boiling azeotrope which distills over with the alcohol. Thus for example methanol and methyl borate form an azeotrope which boils at 54.6° C. For this reason, if high boron utilization is required it is preferred to employ higher boiling lower aliphatic alcohols such as the $C_3$—$C_6$ alcohols, exemplified by isopropanol, n-butanol or sec-butanol. In such cases it is preferred that the corresponding propyl or butyl borate is also employed.

The suitable and the preferred non-polar solvents, the suitable and preferred concentrations of the polymeric compound therein, the suitable and preferred water-miscible liquids, the suitable and preferred amounts thereof which are employed, and the suitable and preferred concentrations of the boric acid ester therein, have all been set out hereinbefore.

The water-miscible liquid preferably is a lower aliphatic alcohol. Where a lower alkanol is used as the water-miscible liquid, it is preferred that the borate ester be so chosen that the alcohol resulting from hydrolysis of the organic borate is the same as the lower alkanol used as the water-miscible liquid.

It will be evident from the foregoing description that it is not always necessary to use as starting material a pure organic borate, since it is also possible to prepare that borate in situ from boric acid and the corresponding alcohol. This may be done to particular advantage where the alcohol used in preparing the borate also is the water-miscible organic liquid. For example, trimethyl borate can easily be prepared in situ by stirring together boric acid and an excess of methanol. The solution of trimethyl borate in methanol thus obtained can then be mixed with a solution of the polymeric compound in the non-polar liquid. After addition of the required proportion of water, the methanol preferably is then removed by distillation, whereby a clear solution of the borate ester product in the non-polar liquid is obtained. The methanol used in this method not only serves as a means of introducing boric acid but also ensures complete homogeneity. The quantity employed is preferably from about two to about four times the stoichiometric amount required for the esterification of the boric acid.

The amount of water used to effect the hydrolysis of the organic borate should be at least the amount theoretically required to convert all of that borate to the corresponding boric acid. Generally, it will be found desirable to use a small to moderate excess—for example, up to about three times the theoretical, or 200% excess—of water, to insure complete hydrolysis of the organic borate. The amount of water added to the reaction mixture is at least the amount required to form an azeotrope with the water-miscible organic liquid added to the reaction mixture, plus the alcohol formed by hydrolysis of the organic borate. Preferably, there is used a moderate excess—up to 100% excess—of water over the minimum required to form the azeotrope. Any water remaining after all of the azeotrope is removed is then removed by distillation. When the boric acid reactant is formed from the alcohol and boric acid in situ, in the initial dissolving of the boric acid water is formed owing to the esterification which occurs. During subsequent stripping of the methanol, the methyl borate present is hydrolyzed and additional water is not required in theory. However, methyl borate forms an azeotrope with methanol boiling well below the boiling point of both components. Therefore, in order to minimize loss due to azeotrope formation additional water (e.g., about one equivalent) is preferably added before stripping.

The reaction can be carried out at any convenient temperature. Usually, the maximum temperature used will be determined by the boiling temperature of the water-miscible liquid used. It is not generally desirable to use temperatures below ordinary room temperatures, since cooling is required in those cases, as little advantage results from the use of such low temperatures, as compared to the use of ordinary room temperatures or above. Temperatures above about 150° C. are seldom necessary. Reasonable reaction rates normally are obtained from about ordinary room temperature (i.e., about 20° C.) to about 120° C.

In all of the foregoing methods for preparing the borate esters of this invention, the amount of the boric acid reactant used, relative to the amount of the polymeric compound used, will depend upon the character of the product—the degree of esterification of the boric acid and/or the hydroxyl groups of the polymeric compound—desired. Normally, substantially the amount of boric acid reactant theoretically required to give the desired product should be used; however, in some cases, a moderate excess—up to about 100% excess—over the theoretical amount may be used to insure rapid reaction, the character of the product being controlled by choice of the reaction time. The borate esters of the invention which have been found to exhibit optimum utility are those in which the weight ratio of boric acid to polymeric compound in the reaction mixture lies within the range of from about 1:10 to about 10:1, and more particularly within the range of from about 1:10 to about 1:1.

In all of the foregoing methods for preparing the new esters, the reactions can be carried out at any pressure. Preferably, the pressure is chosen to maintain any volatile reactant in liquid phase.

The reaction time is not a critical factor in any of the foregoing processes for making the new esters. In general, the reaction is complete in but a few minutes—in some cases as little as 5 to 10 minutes is entirely adequate. In most cases, a somewhat longer reaction time—of the order of 15 to 30 minutes—is desirable to insure complete reaction. Seldom will a reaction time of more than about 4-5 hours be required, and generally no more than 2 hours reaction time is necessary. As has been pointed out hereinbefore, in some cases, it is most convenient to control the character of the desired product by employing an excess of the boric acid reactant or of the polymeric compound, and then choosing a reaction time which results in the desired product.

By means of the methods disclosed hereinbefore, it is possible to prepare boric acid esters containing up to 12% by weight of boron. Usually, however, the boron content of the esters is between about 2% and about 10% by weight.

According to the foregoing methods, the new esters are prepared by reacting the boric acid reactant with the polymeric compound, preferably dissolved in a non-polar liquid. In such cases, the borate ester product in the crude reaction mixture is dissolved in the non-polar liquid. Recovery of the product preferably is accomplished by first removing by vaporization all of the crude reaction mixture which boils below the boiling temperature of the non-polar liquid, then removing any solid material present by filtration, decantation, centrifugation or like treatment of the remaining mixture to give a solution of the borate ester product in the non-polar liquid. Where the non-polar organic liquid used is the gasoline or the lubricant stock in which the borate ester product ultimately is to be dissolved, no further treatment of the resulting solution is required, other than dilution thereof to give the desired concentration of boron. Where the non-polar liquid used is not the liquid in which the borate ester product is ultimately to be dissolved, the borate ester product can be recovered by distillation of the non-polar organic liquid. Alternatively, where the non-polar organic liquid used is a light hydrocarbon, and the borate ester product is to be dispersed in a lubricant stock, recovery of the borate ester product and solution thereof in the lubricant stock is most conveniently effected by mixing the stock with the solution of the borate ester product in the non-polar organic liquid, and then distill off the non-polar organic liquid to give directly a solution of the borate ester product in the lubricant stock.

This constitutes a general description of the compounds of the invention and methods for preparing those compounds. The following examples showing preparation of particular compounds of the invention by those methods are included as illustrations of the invention. These examples are intended only to illustrate the invention, and are not intended to limit that invention in any way. In these examples, the relationship between parts by weight and parts by volume is the same as that which exists between the kilogram and the liter.

EXAMPLE I

A solution of 6.2 parts by weight of a hydrolysed copolymer of $C_{16}$—$C_{18}$ alkenes and vinyl acetate containing 17.3% by weight of hydroxyl groups in 215 parts by volume of xylene was refluxed with 6.2 parts by weight of boric acid until no more water was evolved from the reaction mixture. The product was filtered from undissolved boric acid to give a clear yellow solution of a boric acid polyester in xylene, in which the weight ratio of boron to the polymeric hydroxyl compound was 0.091:1.

EXAMPLE II

A solution of 6.2 parts by weight of the same polymeric hydroxyl compound which was used in Example I in 215 parts by volume of benzene was refluxed with 3.48 parts by weight of boric oxide ($B_2O_3$) until the evolution of water from the reaction mixture ceased. The product was filtered to remove undissolved boric oxide, resulting in a clear yellow solution of a boric acid polyester in benzene, the weight ratio of boron to polymeric hydroxyl compound being 0.044:1.

In a further experiment, a solution of 6.2 parts by weight of the same polymeric hydroxyl compound which was used in Example I in 215 parts by volume of xylene was refluxed with 3.48 parts by weight of boric oxide ($B_2O_3$) until the evolution of water from the reaction mixture ceased. The theoretical quantity of water due to the esterification of the hydroxyl compound was obtained. The product was filtered to remove undissolved boric oxide, resulting in a clear yellow solution of a boric acid polyester in benzene, the ratio of boron to polymeric hydroxyl compound being 0.063:1.

EXAMPLE III

Several experiments were performed. In each experiment, a solution of trimethyl borate in methanol prepared by stirring 6.2 parts by weight of boric acid with 55 parts by volume of boiling methanol until dissolved was reacted with a different amount of the same polymeric hydroxyl compound used in the preceding examples dissolved in 215 parts by volume of xylene. In each case, the solution of polymeric material was added at ambient temperature followed by the rapid addition of a solution of 5.4 parts by volume of water and 32 parts by volume of methanol with vigorous stirring. The methanol, water and some xylene were then removed by distillation, keeping the temperature of the mixture below 120° C., whereby also a proportion of boric acid was removed in the form of methyl borate. About 90 parts by weight of a xylene solution of the boric acid polyester were obtained in each case. When necessary the product was filtered to remove undissolved boric acid. The amount of polymer and the boron:polymer ratio in each case is set out in Table I.

As appears from Table I, the increasing ratio of boron to copolymer in the relation mixture also results in an increasing proportion of boron in the final product.

*Table I*

| Amount of Polymer in Reaction Mixture (parts by weight) | Boron:Polymer Ratio | |
|---|---|---|
| | in Reaction Mixture | in Final Product |
| 12.4 | 0.087 | 0.062 |
| 9.3 | 0.117 | 0.064 |
| 6.2 | 0.175 | 0.086 |
| 3.1 | 0.350 | 0.102 |

EXAMPLE IV

A solution of trimethyl borate in methanol was prepared by dissolving 145 parts by weight of boric acid in 1282 parts by volume of methanol at a temperature of 30° C. 244 parts by weight of the same polymeric hydroxyl compound as was used in Example I and 5000 parts by volume of xylene were added to the solution of trimethyl borate in methanol. The trimethyl borate was hydrolyzed by addition of 126 parts by volume of water and 750 parts by volume of methanol. Subsequently, the methanol and part of the xylene were removed by distillation, and after filtration of the residue, 2130 parts by weight of a solution of a boric acid polyester in xylene, having a boron content of 0.11% by weight was obtained. The ratio of boron to polymer in the final product was about 1:17 by weight.

EXAMPLE V

A copolymer of vinyl acetate and octadecene-1 was prepared by warming a mixture comprising vinyl acetate and octadecene-1, in the mole ratio of 1.9 moles of vinyl acetate per mole of octadecene-1, and containing 1% by weight (based on the weight of olefin) of benzoyl peroxide, to 80° C. for 16 hours. The monomers were stripped off at a temperature of 200° C. at a pressure of 18 millimeters mercury. Alcoholysis of the copolymer was carried out in a glass-lined kettle equipped with stirrer and reflux condenser. The kettle was charged with a mixture of methanol and copolymer, in the ratio of 0.72 part by weight of methanol per part by weight of copolymer, and 1% by weight of the copolymer of sodium methylate was added. The charge was stirred and refluxed for 2 hours (64–65° C.), then was cooled to 45° C. and neutalized with a 10% by weight excess of glacial acetic acid. The mixture was then stripped at 96° C. and 68 millimeters mercury pressure. Analysis of the resulting product indicated that the copolymer had a vinyl acetate plus vinyl alcohol to olefin ratio of 4:1, 76% hydrolysis of the vinyl ester to hydroxyl groups, a molecular weight of about 15,000 and approximately 95 hydroxyl groups per molecule.

50 parts by weight of this copolymer was dissolved in 300 parts by weight of benzene. 30 parts by weight of boric acid were mixed with the resulting solution. The resulting mixture was then heated to reflux, and gently refluxed for one hour. The water of reaction was removed by azeotropic distillation. The benzene solution then was centrifuged to remove solids present, and the resulting clear solution was distilled to give a solid product containing 3.5% by weight of boron.

EXAMPLE VI 50 parts by weight of the copolymer described in Example V was dissolved in 300 parts by weight of benzene. 30 parts by weight of boric acid were mixed with the resulting solution. The resulting mixture was heated to reflux and while gentle reflux was maintained, 60 parts by volume of methanol were added over a period of 60 minutes. The water of reaction and the methanol were removed by azeotropic distillation, the resulting solution was freed of solids by centrifugation and the benzene was removed to give a solid product containing 3.4% by weight of boron.

EXAMPLE VII 50 parts by weight of the copolymer described in Example V were dissolved in 300 parts by weight of benzene. 30 parts by weight of borax were mixed with the resulting solution and the mixture was heated to reflux. While the mixture was gently refluxed, a solution of 12 parts by weight of ammonium chloride in 24 parts by volume of water was added dropwise to the mixture over a period of 30 minutes. Water and ammonia were removed by distillation. The resulting solution was freed of solids by centrifugation and the benzene removed by distillation to give a solid product containing 2.0% by weight of boron.

The novel esters provided by this invention are useful as additives to fuel compositions, particularly gasoline compositions for use in spark-ignited internal combustion motors, especially high-compression automobile and airplane motors. It has been found that when one or more of the esters of this invention are substituted for the halohydrocarbon lead scavengers of gasoline compositions containing, in addition to the base gasoline, a minor but effective amount of a lead-containing antiknock agent, and one or more of either or both of sulfur and phosphorus compounds, the composition, on combustion, gave substantially smaller amounts of solid materials deposited in the combustion chamber(s) of the motor, and those solid materials which were deposited were markedly more innocuous.

In this use, the amount of the new borate esters employed must be at least 0.5, and preferably amounts to from 0.8 to 1.5 theories, based upon the amount of lead in the antiknock agent. As used herein, the term "theory" means that proportion of the particular boron-containing additive employed which is theoretically required to convert all the lead which is present in the fuel or the antiknock mixture to lead ortho-borate.

In such compositions, the usual base gasolines are used, including the straight-run gasolines, the catalytically or thermally reformed gasolines and the catalytically or thermally cracked gasolines. The usual lead-containing antiknock agents, such as the tetraalkyl leads, are used. The sulfur compounds may be naturally occurring sulfur compounds, but preferably are thiophene and its derivatives, such as 2-methyl- and 3-methylthiophene, 2,4-dimethylthiophene, thiophthene, thionaphthene, benzthiophene and the like. The phosphorus compounds include the oil-soluble organic esters of oxyacids and thioacids of phosphorus, including ortho-, pyro- and meta-phosphoric acids, phosphorous acid, and the alkylphosphonic and dialkylphosphinic acids. Suitable esters include the tri(lower-alkyl)-phosphates and phosphites, the triphenyl phosphates and phosphites, tricresylphosphate, triphenyl phosphite, and the like. Preferred phosphorus compounds are trimethyl phosphate and triisopropyl phosphite. The amount of the sulfur and/or phosphorus compounds must be at least 0.5 theory, based upon the amount of lead in the antiknock agent.

In such compositions, no halohydrocarbon lead scavenger is present.

Those compositions may, however, contain other additives, such as oxidation inhibitors or stabilizers (such as hydroquinone, dimethyl-6-tertiary butyl phenol, 2,6-ditertiary butyl-4-methyl phenol, N-phenyl-alpha-naphthyl amine, N,N'-dibutyl-p-phenylenediamine, and the like), gum inhibitors, detergents and dyes.

Those compositions may, however, contain other additives, such as oxidation inhibitors or stabilizers (such as hydroquinone, dimethyl-6-tertiary butyl phenol, 2,6-ditertiary butyl-4-methyl phenol, N-phenyl-alpha-naphthyl amine, N,N'-dibutyl-p-phenylene-diamine, and the like), gum inhibitors, detergents and dyes.

The use of the borate esters of this invention in such compositions is demonstrated by the following examples, which are included only to illustrate one form of utility possessed by the esters of the invention.

EXAMPLE VIII

To a catalytically cracked gasoline, derived from Middle East crude oil, having a final boiling point of 205° C. was added 1.5 cc. of pure tetraethyl lead per Imperial gallon. The fuel containing 0.12% by weight of sulfur in the form of naturally occurring sulphur compounds, corresponding to 15 theories with respect to the lead content.

To one portion of this fuel 0.5 theory of ethylene dibromide and one theory of ethylene dichloride were added as a scavenging agent (composition 1). To another portion of the same fuel a boric acid polyester prepared by reaction of boric acid and a hydrolysed copolymer of $C_{16}$—$C_{18}$ alkenes and vinyl acetate containing 17.3% by weight of hydroxyl groups, as described herein was added in a proportion of 1 theory with respect to the lead content of the fuel.

Both compositions were engine tested by means of a simulated road test in a spark-ignited single cylinder overhead valve engine of 470 cc. having a compression ratio of 8.5:1. The tests were carried out for 96 hours in cycles of 7 minutes, each consisting of 1 minute at full throttle (2500 r.p.m.), 0.5 minute at ¾ throttle (2250 r.p.m.), 4.5 minutes at half-throttle (2000 r.p.m.) and 1 minute at idling speed (800 r.p.m.). The temperature of the cooling water and of the lubricating oil was 70° C. throughout all tests.

After running for 96 hours on each of the five compositions specified above, the engine was dismantled, and the cylinder deposits collected and weighed.

The results of the tests are presented in Table II.

*Table II*

| Composition | Scavenging Agent | Deposit Weight, (g.) |
|---|---|---|
| 1 | Ethylene dibromide and ethylene dichloride | 7.0 |
| 2 | Boric acid polyester | 4.6 |

EXAMPLE IX

The base fuel in this example was a gasoline prepared by mixing 35% by volume of a cat-cracked gasoline having a final boiling point of 100° C., 12% by volume of an alkylate and 53% by volume of a platformate, to which 1.5 cc. of tetraethyl lead was added per Imperial gallon. The gasoline contained 0.009% by weight of sulfur in the form of naturally occurring sulfur compounds, corresponding to 1.0 theory with respect to the lead content.

To five portions of this base fuel a quantity corresponding to 1 theory with respect to the lead content of the gasoline of a boric acid polyester as described in connection with composition 2 in the preceding example was added. Moreover, varying quantities of trimethyl phosphate (compositions 4 and 5) and of butyl thiophene (compositions 6 and 7) were added and all compositions were subjected to the same simulated road test as described in Example VIII.

The results of these tests are summarized in Table III, which for comparison, also includes the results with the base fuel without scavenging agent and the base fuel with a conventional halohydrocarbon scavenger (0.5 theory of ethylene dibromide and 1.0 theory of ethylene dichloride).

| Composition | Scavenging Agent | Sulfur Content (theories) | Phosphorus Content (theories) | Deposit Weight (g.) | Condition of the Deposits |
|---|---|---|---|---|---|
| 1 | None | 1.0 | | 4.9 | Highly fused. |
| 2 | Ethylene dibromide and ethylene dichloride. | 1.0 | | 4.4 | Hard. |
| 3 | Boric acid polyester | 1.0 | | 2.2 | Fused. |
| 4 | do | 1.0 | 0.2 | 2.3 | Slightly fused. |
| 5 | do | 1.0 | 1.0 | 3.0 | Powdery. |
| 6 | do | 3.0 | | 2.9 | Do. |
| 7 | do | 6.0 | | 2.2 | Do. |

It is clear from the results of these tests that substitution of one or more of the borate esters of this invention for the halohydrocarbon lead scavengers of these compositions results in substantial diminution in the amount of combustion chamber deposits and in substantial reduction in the deleterious effects of those deposits.

The novel esters of the invention also have the effect of detergents and dispersing agents, preventing or substantially reducing clogging of fuel lines, carburetor jets, valves and the like, used in connection with such fuels.

In the case of the use of the esters of the invention in crankcase lubricating oil, concentrations of those esters are ordinarily employed to provide at least 0.005% by weight of the element boron based on the total crankcase lubricating oil, and preferably at least 0.05% by weight, more especially at least 0.1% by weight boron. It is normally not necessary or desirable to exceed 5% by weight boron, and the preferred maximum is 1% by weight boron based on the total crankcase lubricating oil. Other additives can also be present in the case of the lubricating oils of the invention, for example detergents, viscosity index improvers, extreme pressure agents, pour point depressants, anti-oxidants and the like.

The esters of the invention are also useful as mild extreme pressure agents in lubricating oils and greases, as anti-oxidants, and as lubricating oil detergents.

We claim as our invention:

1. A boric acid ester of a polymeric compound containing a plurality of non-acidic hydroxyl groups, said polymeric compound having a molecular weight of at least 1000, and having been prepared by copolymerization of an alpha-alkene having at least 8 carbon atoms per molecule and a vinyl ester of a lower fatty acid, and thereafter hydrolyzing the resulting copolymer to hydrolyze at least a part of the vinyl ester linkages to hydroxyl groups.

2. A boric acid ester of a hydrolyzed copolymer of an alpha-alkene having at least 10 carbon atoms with a vinyl ester of a lower fatty acid, said copolymer having a molecular weight of from about 1500 to about 50,000, said copolymer containing at least two non-acidic hydroxyl groups.

3. An ester according to claim 2 wherein the vinyl ester is the ester of a fatty acid of up to five carbon atoms.

4. An ester according to claim 2 wherein the vinyl ester is the ester of a fatty acid of up to five carbon atoms and the ratio of vinyl groups to olefin groups in said copolymer is from about 1:1 to about 6:1.

5. A boric acid ester of a hydroxy-containing polymeric product comprising a hydrolyzed copolymer of a vinyl ester of a lower fatty acid, and an alpha-alkene which has an uninterrupted chain of at least 10 carbon atoms, and containing units of the vinyl ester, vinyl alcohol and the monomer possessing at least 16 carbon atoms, said copolymer having an average of 1 to 6 vinyl alcohol and vinyl ester units per unit of the monomer having the chain of at least 16 carbon atoms and 25% to 99% of the vinyl alcohol and vinyl ester units being vinyl alcohol units, and the said copolymer having a molecular weight between 4,000 and 50,000 as determined by light scattering method.

6. An ester according to claim 5 wherein the vinyl ester is vinyl acetate.

7. An ester according to claim 5 wherein the alpha-alkene contains at least 16 carbon atoms.

8. An ester according to claim 5 wherein the copolymer has an average of 1 to 5 units of the vinyl alcohol and vinyl ester units per unit of the monomer having the chain of at least 10 carbon atoms and a molecular weight of about 30,000.

9. An ester according to claim 5 wherein the alpha-alkene is an alpha-alkene mixture containing octadecene-1.

10. A boric acid ester of a hydroxy-containing polymeric product comprising a copolymer of (1) vinyl alcohol, (2) vinyl acetate, and (3) an alpha-alkene mixture containing octadecene-1, said copolymer having an average of 3 to 5 vinyl alcohol and vinyl acetate groups per unit of alpha-alkene and from 95% to 99% of the vinyl alcohol and vinyl acetate units being vinyl alcohol units, and having a molecular weight of between 15,000 and 30,000.

11. A boric acid ester of an oil-soluble hydrolyzed copolymer of an alpha-alkene of at least 8 carbon atoms with a vinyl ester of a lower fatty acid, said copolymer containing at least two non-acidic hydroxyl groups.

References Cited in the file of this patent

UNITED STATES PATENTS

| | | |
|---|---|---|
| 2,341,262 | Brun et al. | Feb. 8, 1944 |
| 2,343,898 | Griffin et al. | Mar. 14, 1944 |
| 2,388,225 | Brooks et al. | Oct. 30, 1945 |
| 2,444,712 | Signaigo | July 6, 1948 |
| 2,445,555 | Binda | July 20, 1948 |
| 2,457,603 | Salzberg et al. | Dec. 28, 1948 |
| 2,607,765 | Czerwin et al. | Aug. 19, 1952 |
| 2,716,049 | Latour | Aug. 23, 1955 |
| 2,800,401 | Lusebrink et al. | July 23, 1957 |

FOREIGN PATENTS

| | | |
|---|---|---|
| 413,624 | Great Britain | Oct. 13, 1932 |